United States Patent

[11] 3,579,072

| [72] | Inventors | Dexter Robert Plummer<br>Leicester;<br>Keith Lawrence Wright, Knighton; Colin<br>Arthur Wild, Stoneygate, England |
|---|---|---|
| [21] | Appl. No. | 769,087 |
| [22] | Filed | Oct. 21, 1968 |
| [45] | Patented | May 18, 1971 |
| [73] | Assignee | The Rank Organisation Limited<br>London, England |
| [32] | Priority | Nov. 3, 1967 |
| [33] | | Great Britain |
| [31] | | 50162/67 |

[54] SERVO POSITION CONTROL INCLUDING INTEGRAL CONTROL IN FOREWARD AND FEEDBACK CONTROLS
8 Claims, 1 Drawing Fig.

[52] U.S. Cl................................................. 318/609,
318/611
[51] Int. Cl.................................................. G05b 11/36
[50] Field of Search............................................318/20.390,
20.395; 318/20.400

[56] References Cited
UNITED STATES PATENTS

| 2,713,135 | 7/1955 | Macklem | 318/(20.400X) |
| 3,391,317 | 7/1968 | Bell | 318/(20.395X) |
| 3,428,149 | 2/1969 | Burch | 318/(20.395X) |

*Primary Examiner*—T. E. Lynch
*Attorney*—Holcombe, Wetherill and Brisebois

ABSTRACT: A control system for an actuator, for example, a positional control motor for a camera, includes a demand unit which provides demand signals representative of different positions or energization levels of the actuator. A control signal is generated by an integrator which is responsive to the demand signal and which compares the change in demand with the state of the actuator immediately before the commencement of the change, as indicated by a memory signal provided by a further integrator. This control signal, and the actuator energization level, changes at a rate dependent upon, and preferably proportional to, the change in demand. Preferably, therefore, the system is such that a given change in actuator energization takes place in a time interval which is independent of the magnitude of the change in demand.

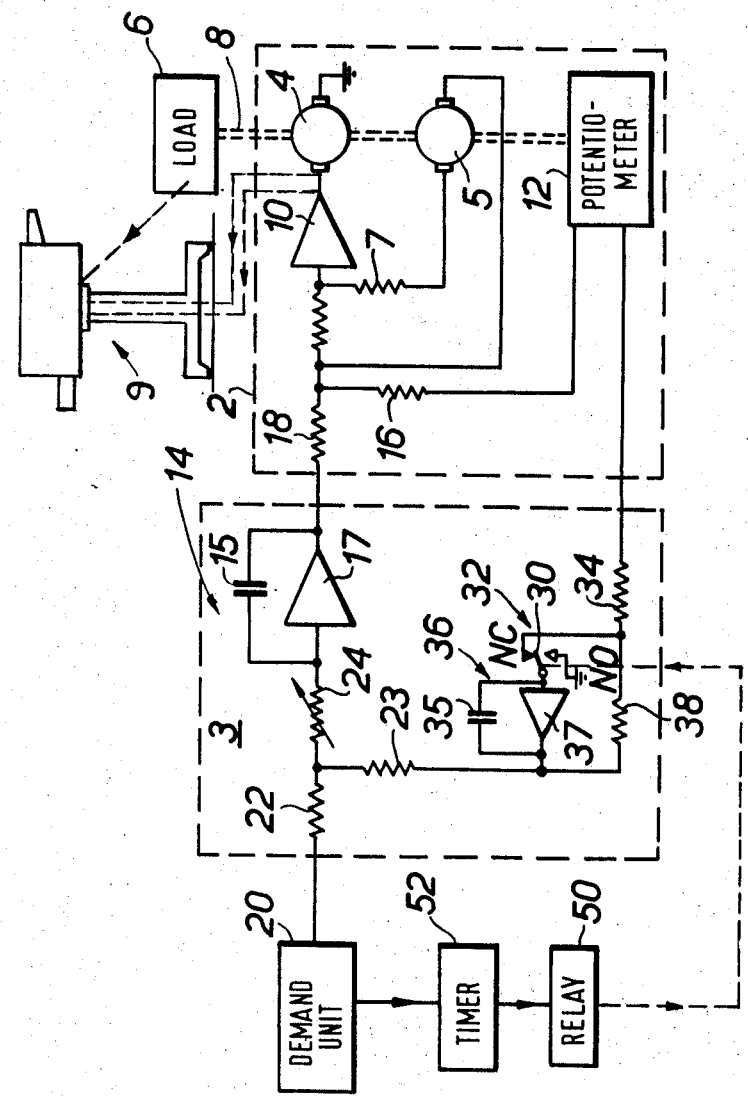

SERVO POSITION CONTROL INCLUDING INTEGRAL CONTROL IN FOREWARD AND FEEDBACK CONTROLS

This invention relates to control systems and is particularly but not exclusively concerned with servocontrol systems. The invention is particularly applicable to servocontrol systems for use in conjunction with television or motion picture cameras, and may be employed, for example, for controlling panning or tilting movements of a camera, changes in the focus or aperture setting of the camera objective, or, where the camera has a zoom objective, changes in the focal length setting of the objective in response to a given demand. Where the spatial position of a camera, as distinct from its attitude, is to be controlled, the control system of the invention may be employed for controlling changes in the spatial position.

An object of the invention is to provide a control system including a control signal generating means responsive to a change in the demanded level of energization of an actuator to provide a control signal which changes at a rate determined by the magnitude of the change in demand, actuator control means for controlling the level of energization of the actuator in response to said control signal, at a rate dependent upon the magnitude of the demand change, and means for maintaining constant the level of actuator energization when the demanded level is reached.

It will be appreciated that the invention displays particular advantages in a television or motion picture camera in which at least two functions are servo operated. In such a case both or all of any demanded changes in these functions can be arranged to terminate simultaneously, thus avoiding any time delay between the completion of such changes. This is in contrast to a conventional position sensitive servocontrol system, in which the rate of operation of the actuator, if controlled at all, is substantially constant so that the time taken to complete any change demanded in a given function will depend upon the magnitude of the demand increment. The time interval between the completion of changes in two functions operated by two separate servocontrol systems may accordingly be quite considerable if significantly different demands are applied to these systems. In the case, say, where panning and tilting of the camera are servo operated by two separate servocontrol systems and significantly different changes in pan and in tilt positions are demanded, the panning change, in one example, will terminate well before the tilting change and an extremely disjointed and distracting effect will be produced upon the viewer. This effect, which is avoided by the present invention, becomes particularly advantageous where, inter alia, panning and zooming of the camera objective are effected by independent servocontrol systems.

By combining servocontrol systems of the present invention for movement control, i.e. for zooming, panning, tilting and the like, with conventional control systems of the present invention for energization, for example, for energizing lamps to control the level of studio lighting, all changes in these functions, and indeed in all variable functions, can be arranged, not only to proceed apparently linearly and smoothly to a viewer but to terminate simultaneously.

An embodiment of the invention will now be particularly described by way of example with reference to the accompanying drawing, which is a schematic circuit diagram of a servocontrol system for operating one of the functions of a television or motion picture camera.

Referring to the drawing, the system includes a basic position servocontrol loop indicated generally at 2. This loop comprises an actuator in the form of a reversible electric motor 4 arranged to drive a load 6, such as the pan or the tilt mechanism of a television or motion picture camera 9 by way of a suitable coupling 8. The motor 4 is energized from a power amplifier 10. The output of amplifier 10 is responsive to a feedback signal which is derived from a positive sensitive reset device 12 such as a potentiometer coupled to move with the motor 4 and which is indicative of the motor position and to a control signal derived from a control signal generating means indicated generally at 3. The feedback and the control signals are combined by way of resistors 16 and 18. A tachometer generator 5 or like speed responsive device is coupled to run with the motor 4 and to supply a damping signal to the amplifier 10 by way of a summing resistor 7.

The servocontrol system is arranged to produce a change in position of the motor 4 under control of a control signal provided by the generating means 3 in response to a demand signal provided by a demand unit 20. The demand unit 20, which may include a suitably energized potentiometer, is arranged when operated manually or otherwise to provide an output potential which is representative of a demanded position of the motor 4.

The control signal is derived from an integrator indicated generally at 14 and comprising a capacitor 15 connected across a high gain operational amplifier 17. The input to the integrator 14 is passed through a variable resistor 24 and is obtained by summing, through summing resistors 22, 23, the output from the demand unit 20 and a memory signal provided by a further integrator indicated generally at 36 comprising a capacitor 35 connected across an operational amplifier 37. Both the operational amplifiers 17 and 37 are inverting amplifiers.

The input to the integrator 36 is taken through a changeover switch 32 having a movable arm 30. When the changeover switch arm 30 is in the NC position, as shown in the drawing, an input is applied to the integrator 36 through a potential-dividing chain comprising resistors 34, 38 which is connected to the reset device 12: the input to the integrator 36 is therefore effectively the result of comparing the integrator output with the position feedback signal provided by the device 12. When the switch arm 30 is in the NO position the input to the integrator 36 is earthed, and the output of the integrator 36 is maintained constant at the value which it held upon changeover of the switch 32. Thus upon changeover of the switch arm 30 from the NC to the NO position the output of the integrator 36 is effectively a memory signal representative of the motor position at the instant of changeover.

The arm 30 of the switch 32 is operable by means of a relay 50 which is energized from an interval timer 52, the arrangement being such that the arm 30 remains in the NC position when the timer 52 is inoperative but is moved into its NO position upon initiation of operation of the timer 52.

The timer 52 is operatively connected to the demand unit 20 so that, when the latter is operated to demand a change in the position of the motor 4, it initiates operation of the timer 52 and at the same time moves the switch arm 30 into its NO position. The timer 52 is deenergized automatically, returning the switch arm 30 to its NC position, after a predetermined time interval which, as will be clear from the description which follows, is arranged to anticipate the instant at which the motor 4 reaches the position demanded.

The operation of the system is as follows. It will be assumed that the system is in static positional equilibrium, so that the timer 52 is inoperative, with the output of the demand unit 20 static at $\pm V_A$ volts and the switch arm 30 in its NC position. The position of the motor 4 corresponds to that demanded, so that the feedback signal from the reset device 12 is also $+V_A$ volts. The signal provided by the integrator 36 is therefore $-V_A$ volts, which exactly balances the demand signal from the demand unit 20, so that the input to the integrator 14 is effectively zero: this prevents the output of the integrator 14 from changing, this output remaining constant at $-V_A$, corresponding to the value last integrated by the integrator 14. Consequently the input to the amplifier 10 is balanced, and the motor 4 held stationary.

When a change in the position of the motor 4 is required, the demand unit 20 is operated to produce a demand signal $+V_B$ corresponding to the new demanded motor position.

The operation of the demand unit 20 initiates operation of the timer 52, and causes changeover of the switch arm 30 from the NC to the NO position. The integrator 36 now integrates zero, and consequently provides a memory signal which remains constant at $-V_A$.

The input supplied to the integrator 14 through the variable resistor 24 is now unbalanced and equal to $V_B-V_A$: this input voltage corresponds to the demanded change in position of the motor 4. The output of the integrator 14 changes substantially linearly to $V_B$ in a predetermined time determined by the magnitudes of the resistor 24 and the capacitor 15. Thus the rate of change of the output from the integrator 14 is directly proportional to $V_B-V_A$ and, therefore, to the magnitude of the change in demand.

The position servo loop 2 follows the changing control signal from the integrator 14, and accordingly the speed of the motor 4 (or the level of energization of any actuator provided in place of the motor 4) varies linearly at a rate proportional to the change in demand. When the control signal reaches the voltage $-V_B$ the demanded change of motor position has been effected, and the output from the reset device 12 is substantially equal to $V_B$: at this point the timer 52 switches off and causes the switch arm 30 to be reset to the NC position. This changes the memory signal output from the integrator 36 to $-V_B$, and the input to the integrator 14 is then again balanced, stabilizing the output of the integrator 14 at $-V_B$.

Since the rate of change of the control signal output from the integrator 14 is proportional to the demand change, the time taken for the motor 4 to undergo any demanded change will be the same, irrespective of the magnitude of the change, assuming that the servo loop 2 is capable of following the changes in control signal closely. This time is equal to the time interval timed in the timer 52 and is determined by suitable calibration of the control system. The magnitude of the time interval can itself be predetermined by varying the time constant of the integrator 14, conveniently by adjusting the variable resistor 24, or alternatively by varying the integrating capacitor 15 or both resistor 24 and capacitor 15. The timer 52 is independently adjusted so that its timed interval is always equal to the aforesaid time taken for the motor 4 to undergo the demanded change. For example, the means (not shown) for adjusting the timer 52 may be ganged to the variable resistor 24 to ensure that the timer 52 is always adjusted in sympathy with the resistor 24.

In a control system according to the invention the output of the amplifier 10 is used directly to control the operation of the motor 4 or other actuator. When the invention is employed in a television or motion picture camera arrangement a separate servocontrol system is used for controlling each variable camera function, such as, for example, panning, tilting, focusing and zooming. The time constants of the respective integrators 14, and the time intervals timed by the respective timers 52, are adjusted so that where two or more such functions are varied, the changes terminate substantially simultaneously.

Where a number of control systems are provided, each may share at lease one common element. For example, several actuators may be controlled by a single control system, so that operation of all the actuators when effecting simultaneous changes in demand takes place in a single time interval, as shown in broken lines in the drawing.

In most camera applications of the invention, the control signals are arranged to vary substantially linearly to produce a substantially linear, smooth transition as observed by a viewer. However, in the case of zoom control, where the law governing the movement of the zoom lens component and the observed magnification is exponential, it is necessary to modify the integrator 14, or to replace this by a function generator or like circuit arrangement so as to provide a control signal which varies nonlinearly with time in the desired manner, so as to produce an apparently linear zoom change as observed by a viewer.

Moreover, circuits are preferably provided in the demand units controlling pan and tilt of a camera to ensure that, for any pan or tilt change an apparently linear movement of a subject across the camera field of view is observed when zoom changes are effected concurrently. These circuits will be controlled by the zoom position feedback signal so that, as the camera zooms into a narrow angle field of view the pan and tilt actuators will be reduced in speed, while as the camera zooms out to a wide angle the pan and tilt actuators are increased in speed. This speed compensation for zoom changes may conveniently be effected by varying the power supplies to potentiometers in the respective demand units.

In addition, the control circuit of the invention may be used to energize studio lighting and the like so that any increase in the level of this lighting which may, for example, be necessary to compensate for any changes in zoom setting, also terminates simultaneously with the zoom changes. This serves, therefore, to eliminate any picture discontinuities which the viewer may find distracting.

In an alternative embodiment of the invention, the timer may be replaced by a null detector system which restores static equilibrium when the new demanded position, or the new demanded level of energization has been reached.

It will be appreciated that while the invention has been described in connection with an analogue system, it is equally applicable in a digital system; indeed, the system is not limited to the electrical system described, but is equally applicable to hydraulic or mechanical systems.

We claim:

1. A control system comprising in combination:
    an actuator,
    a demand unit providing a demand signal representative of a demanded level of energization of the actuator,
    a reset device operatively associated with the actuator and providing a feedback signal indicative of the level of energization of the actuator,
    an integrator means for said feedback signal,
    a normally closed switch connecting the integrator means to the reset device to integrate the feedback signal,
    means effective to open said switch automatically upon a change in the demand signal to store in the integrator means a memory signal representative of the level of energization of the actuator at the commencement of a change in said level,
    control signal generating means comparing the demand signal with the memory signal to provide a control signal representative of the change in demand,
    actuator control means controlling the level of energization of the actuator in response to said control signal, at a rate dependent upon the magnitude of the change in demand, and
    means maintaining constant the level of energization of the actuator upon completion of a demanded change in said level.

2. A control system as claimed in claim 1, wherein the control signal generating means include an integrator which integrates an input signal derived from the demand signal and said memory signal.

3. In a television or motion picture camera a control system as claimed in claim 1, wherein the actuator is operatively associated with a movable component of the television or motion picture camera, the rate of movement of the actuator being dependent upon the magnitude of a positional demand change, the said means maintaining constant the level of actuator energization being effective to halt movement of the actuator when the demanded change has been effected.

4. A control system as claimed in claim 1, wherein the said control signal generating means provide a control signal which varies substantially linearly with time at a rate substantially proportional to the magnitude of the demand change, whereby the change in the level of actuator energization takes place in a time interval which is substantially independent of the magnitude of the demand change.

5. A control system as claimed in claim 1, including means effective to vary the rates of change of the control signal which correspond to given demand changes.

6. A control system as claimed in claim 4, including a plurality of different respective actuators which share operating time with a common said control signal generating means, whereby changes in the levels of energization of said actuators are completed within time interval irrespective of the magnitudes of the changes.

7. A control system as claimed in claim 4, including an interval timer which is operative to halt the change in actuator excitation level automatically after said predetermined time interval following the initiation of the change in demand.

8. A control system as claimed in claim 4, including a timer adapted to initiate opening of the normally closed switch upon a change in the demand signal and, after the said time interval, to reclose said switch, whereby the memory signal provided by the integrator means throughout said interval is representative of the level of energization of the actuator at the commencement of the said change in demand.